United States Patent [19]

Lilie

[11] Patent Number: 4,930,405
[45] Date of Patent: Jun. 5, 1990

[54] RECIPROCATING PISTON COMPRESSOR FOR SMALL REFRIGERATING MACHINES AND ASSEMBLY METHOD THEREFOR

[75] Inventor: Dietmar E. B. Lilie, Joinville, Brazil

[73] Assignee: Empressa Brasileira de Compressores S/A, Brazil

[21] Appl. No.: 280,131

[22] Filed: Dec. 5, 1988

[30] Foreign Application Priority Data

Dec. 17, 1987 [BR] Brazil .................................. 8707047

[51] Int. Cl.⁵ ............................................. F01B 29/00
[52] U.S. Cl. ......................................... 92/128; 92/129;
92/216; 92/255; 92/256; 403/379; 74/579 E;
74/579 R
[58] Field of Search ................. 92/129, 109, 179, 187,
92/188, 255, 256, 128, 216; 417/415; 403/378,
379; 74/44, 579 E, 579 R

[56] References Cited

U.S. PATENT DOCUMENTS

| 554,727 | 2/1896 | Pridmore | 403/379 |
|---|---|---|---|
| 2,569,707 | 10/1951 | Cardell | 74/44 |
| 2,605,044 | 7/1952 | Hill | 417/415 |
| 2,675,759 | 4/1954 | Yarger | 417/415 |
| 3,659,502 | 5/1972 | Friedman et al. | 92/187 |
| 4,602,445 | 7/1986 | Nilsson | 403/379 |
| 4,770,058 | 9/1988 | Lilie et al. | 74/579 E |

FOREIGN PATENT DOCUMENTS

| 327944 | 10/1920 | Fed. Rep. of Germany | 74/579 |
|---|---|---|---|
| 2583122 | 12/1986 | Fed. Rep. of Germany | 417/415 |
| 355897 | 9/1905 | France | 403/379 |
| 733550 | 3/1931 | France | 74/579 |
| 252208 | 12/1947 | Switzerland | 74/579 E |
| 512776 | 12/1937 | United Kingdom | 74/579 E |

Primary Examiner—Robert E. Garrett
Assistant Examiner—Thomas Denion
Attorney, Agent, or Firm—Darby & Darby

[57] ABSTRACT

In a compressor which has a connecting rod comprising: a second eye (31) connected to the crank pin (12) and a crankshaft (7) and including a radial projection (32) with a longitudinal slot (33), said longitudinal slot (33) having at least two end faces (35) and two opposite lateral faces (34);

a first eye (21) connected to the piston and including a rod (22) with an end portion, said end portion having at least two end faces (25) and two opposite lateral faces (24), said end portion being fitted in said longitudinal slot (33) so as to bring the end faces of the slot (33) and the rod (22) into contact therefore defining the axial distance between the centers of the eyes.

According to the invention a clamp (40) preferably of spring steel, is fitted in the housing (28, 29, 38, 39) of the radial projection (32) of the second eye (31) and the end portion of the rod (22). The clamp, (40) due to its elastic action, is designed in such a way as to press both parts (20, 30) of the connecting rod (20, 30) to a position of minimum axial distance between the centers of the eyes (21, 31) and fastening these parts (20, 30) in a relative and predetermined position of the eyes (21, 31).

10 Claims, 3 Drawing Sheets

RECIPROCATING PISTON COMPRESSOR FOR SMALL REFRIGERATING MACHINES AND ASSEMBLY METHOD THEREFOR

The present invention relates in general to an improvement of a reciprocating piston compressor for small refrigerating machines and more specifically to a new construction and assembly method for the connecting rod used in such compressor.

The compressors of this type have a connecting rod comprising a first and second eye, the first being connected by means of a wrist pin to the reciprocating piston, and the second eye being connected to a crank pin which is on one end of a crankshaft. This crankshaft is orthogonal to the piston stroke and supportes at its other end the rotor of an electric motor. The motor stator is supported on a crankcase that includes a crankshaft bearing portion, a cylinder, a suction and a discharge muffler. This crankcase is mounted within a housing by means of coil springs and this housing is closed with the top portion forming a hermetically sealed unit.

As described in the Brasilian patent application PI 8501182 of the same applicant, different constructive solutions have been proposed to permit assembling the piston, connecting rod and crank pin regarding the reduced dimensions of the components and reduced space for mounting this assembly.

One of these solutions presents a bushing which is press fit between the second eye of the connecting rod and the crank pin. To permit assembling, the second eye of the connecting rod has its inside diameter larger than the crank pin, with the clearance between them filled in by the bushing.

Besides making the mounting somewhat difficult, this solution also requires additional parts.

Patent specifications PI 8103673/BR and EPO 0046142 disclose the solution of a slot extending through the cylinder wall so as to permit the connecting rod and the wrist pin to be inserted in the piston during the assembly. This slot in the cylinder wall suffers the disadvantage of reducing its stifness, causing dimensional deviations during cylinder machining.

Anther possible solution is shown in Brasilian patent specification PI 8204474/BR, wherein the crankshaft and crank pin are constructed in two separate pieces connected during assembly which is difficult. This solution requires the provision of additional parts to achive the assembly of the crank pin to the crankshaft.

These is also the possibility of arranging the crankcase and the crankshaft bearing portion in two separate parts, which are assembled at the same time that the connecting rod is inserted over the crank pin, after the piston, crank pin and connecting rod assembly is in its proper place. This solution presents the same disadvantages of that mentioned before.

Patent Specification DE 3123708 A1 proposes a connecting rod with a head formed in two parts, which are connected by means of specially designed clamps.

This construction presents as disadvantages the high number of components for a part which should be simple in principle, besides keeping in movement an excessively increased mass.

Finally, Brazilian Patent Specification PI 8006896/BR and PI 8201683/BR propose connecting rods with two-piece rods, so that these two pieces can be connected together by means of joints, usually employing pins. As in the aforementioned solution, this arrangement requires also the provision of additional parts, which increase the cost of the product, make its assembly difficult and increase the reciprocating mass.

The aforementinoned problems of prior art compressors have been overcome by the solution described and claimed in the patent application PI 8501182 (8th Mar. 1986) of this applicant.

The solution of this applicant shows a two-piece connecting rod, and more specifically a new arrangement comprising a two part rod that permit easy mounting of the piston, connecting rod and crank pin assembly without requiring the provision of additional connecting parts, which would increase the cost of the product, increase its mass and make its assembly difficult.

According to this solution it is provided a reciprocating piston compressor for a refrigerating machine, of the type including a connecting rod with its first eye connected to the compressor piston by means of a wrist pin and connected with its second eye to the crank pin of crank shaft, wherein the said second eye of the connecting rod includes a radial projection provided with a longitudinal slot extending at least over part of the thickness of the radial projection and presenting at least two internal end faces and two opposite lateral faces, its first eye being provided with a lengthened radial projection defining the rod of the connecting rod and having its end portion formed with at least two end faces and two opposite lateral faces and fitted in the slot of the second eye, the axial distance between the centers of the eyes being defined by the contact between two surfaces of the projection of the second eye, the corresponding adjacent lateral faces of the slot of the radial projection of the second eye and the rod being fastened together so as to maintain the geometrical axes of the two eyes coplanar. The fastening between the adjacent lateral faces of the slot and the rod is accomplished, according to a first solution, through a process of brazing in which a silver alloy filler metal is melted filling in the clearance between the respective adjacent lateral faces of the slot and the rod. A second solution for fastening the two pieces together is the use of suitable adhesives to fill in the clearance between the respective adjacent lateral faces of the slot and the rod. In both solutions a punch introduced through the cylinder must exert a slight pressure on the head of the piston so as to force the piston against the crank pin when it is in the lower dead center. In this manner the end portion of the rod is mounted and held in a proper position inside the slot during the welding or glueing operation.

In spite of its high level of reliability the process of welding has the inconvenience of producing waste material, specially that produced by the cleaning paste which is applied just before welding is performed.

The fastening by means of adhesives does not have the same inconvenience described before but some time is required in this case for curing the adhesive. Although this time of curing may be reduced by means of catalysts it is allways a trouble in the mass production. Furthermore, the intense aging of the adhesive, caused in general by the conditions in which the compressor operates, decreases its resistance and the reliability of the assembly.

In spite of the advantages and technical effects attained with the constructive solution disclosed in the patent application PI 8501182, further studies have shown that it colud be still much improved, regarding specially the fastening of the two pieces and the mounting operation of the piston, connecting rod and crank pin assembly.

A general purpose of this invention is to make an improvement in a reciprocating piston compressor and its assembly method, and more specifically in the hermetic compressor claimed in the patent application PI 8501182, in order to obtain a new type of fastening of the two pieces of the connecting rod and to mount the piston, connecting rod and crank pin assembly in an easier way, so reducing the time required to mount this assembly.

The features of making the assembly easier and reducing the time required for it have a great importance since these compressors are produced on a large scale.

Regarding the improvement which is proposed, the present invention provides a compressor which includes a connecting rod with its first eye connected to the compressor piston and connected with its second eye to the crank pin of a crankshaft, wherein the said second eye of the connecting rod includes a radial projection with opposite lateral faces, and superior and inferior faces, provided with a longitudinal slot extending at least over part of the thikness of the radial projection and presenting at least two internal end faces and two opposite lateral faces, its first eye being provided with a lengthened radial projection defining the rod of the connecting rod and having its end portion formed with at least two end faces, two opposite lateral faces, and superior and inferior faces, and fitted in the slot of the second eye, the axial distance between the centers of the eyes being defined by the contact between at least two of the mentioned end faces of the rod and the slot of the radial projection of the second eye.

According to the invention a clamp is provided to be fitted into a groove. Part of this groove is formed in a portion of the radial projection of the second eye and its other part is formed in the end portion of the rod. The clamp is formed so as to force and keep, when fitted in the corresponding groove, and by means of elastic action, the two parts of the connecting rod in a position of minimum radial distance between the eyes and in a predetermined relative axial position.

The elastic action of the clamp, preferably manufactured of spring steel, creates during the mounting of the piston, connecting rod and crank pin assembly an elastic force strong enough to maintain the end portion of the rod correctly in the radial slot of the second eye.

The clamp makes it possible, in a very reliable way, for the transmission of force between the two parts of the connecting rod.

According to an embodiment of the invention, in which the slot of the second eye and the end portion of the rod have the same height, a U-shaped clamp having its ends parallel and angling outwards from its base plane is fitted in aligned grooves which are made in the superior and inferior surfaces of the radial projection of the second eye and on the end portion of the rod. These grooves are orthogonal to the geometrical axis of the rod and the basic portion of the clamp seats in a corresponding groove which is made in a lateral projection of the radial projection of the second eye and then is retained by means of a small deformation made in the mentioned lateral projection.

The invention will now be described with reference to the enclosed drawings, in which.

Figure 1:
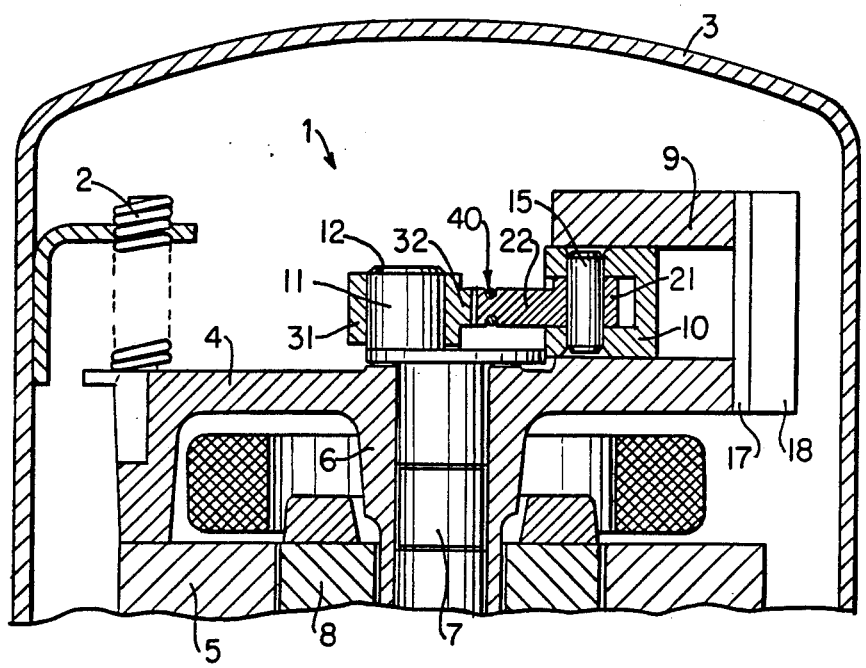
FIG. 1 shows a fragmentary diagrammatic longitudinal section through a sealed compressor with reciprocating piston, according to the present invention.

Referring to FIG. 1, the motor-compressor unit 1 is suspended within a housing 3 by means of coil springs 2 (only one is shown). A crankcase 4 serves as support for mounting the stator 5 of the electric motor and includes a bearing portion 6 for supporting the crankshaft 7 on which is mounted in the lower section the rotor 8 of the motor. The crankcase 4 also includes a cylinder 9, inside which reciprocates the piston 10. The crankshaft 7 has on its upper end a crank pin 11 having a free upper end 12.

Figure 2:
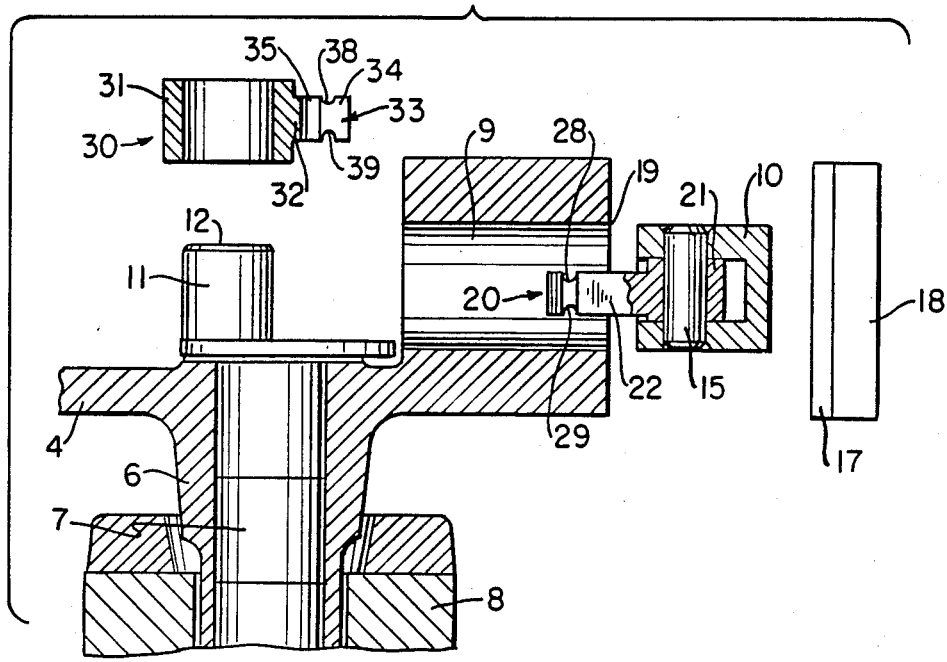
FIG. 2 shows on a larger scale a part of FIG. 1, illustrating the dismounted connecting rod and piston before assembling in the cylinder of the compressor.

As can be seen in FIGS. 1 and 2, the cylinder 9 has at its closed end opposite the crankshaft a valve plate 17 and a cylinder head 18 of conventional construction. The connecting rod shown in FIGS. 3 and 4 comprises two parts 20 and 30 connecting the piston 10 to the crank pin 11 of the crankshaft 7, an shown in FIG. 1.

The first part 20 of the connecting rod comprises the first eye 21 from which extends a lengthened radial projection 22, which defines the rod of the connecting rod, this first eye 21 being connected to the piston 10 by a wrist pin 15.

The second part 30 of the connecting rod comprises the second eye 31 from which extends a short radial projection 32 provided with a longitudinal slot 33, this second eye 31 bein engaged over the crank pin 11 of the crankshaft 7.

Figure 3:
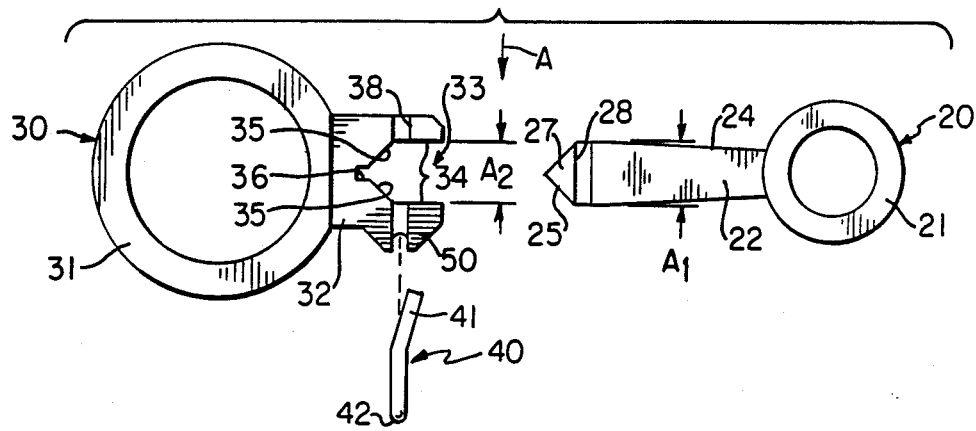
FIG. 3 shows an exploded top view of the two pieces of the connecting rod and the clamp.
Figure 4:
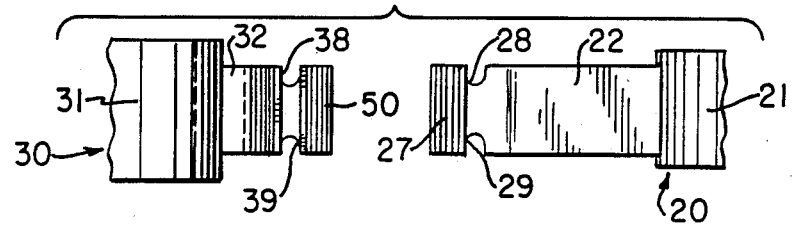
FIG. 4 shows a lateral view of the assembly shown in FIG. 3 when looked from the direction indicated by the arrow IV.

In the arrangement shown in FIGS. 3 and 4, the slot 33 of the second eye 31 extends over the whole thickness of the small projection 32, presenting two opposite and parallel lateral faces 34 two "V" shaped internal end faces, with its vertex provided with an identation 36. This is to avoid the surface finishing of the slot 33 having any interference in the fitting of the two parts 20 and 30 of the connecting rod. In this arrangement, the end portion 27 of the rod 22 linked to the first eye 21 presents two faces 25 forming a "V" with a somewhat rounded vertex, these faces being dimensioned to permit full contact with the respective internal end walls 35 of the slot 33.

This "V" shaped fitting eliminates undesirable tranverse deviations in this kind of part, providing a self-aligning fitting which will keep the correct axial distance between the first and second eyes besides keeping its geometrical axes coplanar during the fastening operation (to be explained later) without needing additional external devices to control the relative position between the two pieces of the connecting rod during assembly.

In this arrangement the width A1 of the end portion of the rod 22 is slightly smaller than the width A2 of the slot 33 so as to provide a small clearance between the lateral faces 34 of the slot 33 and the adjacent walls 24 of the end portion 27 of the rod 22. This small clearance does not impair the relative position of the two parts, because of the "V" shaped fitting of the end walls.

In this construction, the radial projection 32 of the second eye 31 is provided with two grooves, both orthogonal to the geometrical axis of the rod 22, one superior 38 and one inferior 39. In a similar way, the radial projection 22 of the first eye 21 is also provided with two grooves, both orthogonal gonal to its geometrical axis, one superior 28 and one inferior 29.

When the connecting rod is mounted, and the contact between the two end faces 25 of the rod 22 with the respective internal end walls 35 of the slot 33 takes place, the transversal grooves 38 and 39 of the second eye 31 must be kept aligned with the transversal grooves 28 and 29 of the first eye 21.

In the construction illustrated, the fastening between the two pieces 20 and 30 of the connecting rod is carried out by means of a U-shaped clamp 40 having its end valves parallel and angling outwards from its base plane. The clamp is made of circular cross-section spring steel wire.

Figure 5:
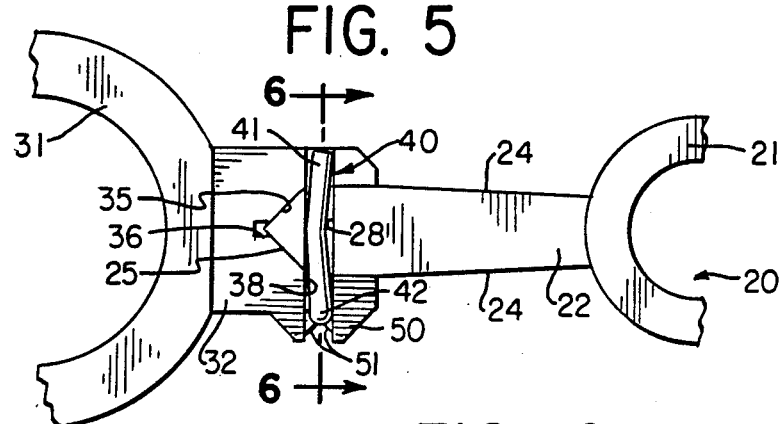
FIG. 5 shows on a larger scale the top view of the joint after mounting the elastic clamp in the connecting rod.
Figure 6:
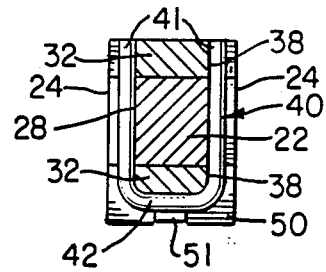
FIG. 6 shows the section VI—VI of the FIG. 5.

As shown in FIGS. 5 and 6, the lateral arms 41 of the clamp 40 are introduced in the respective grooves 38, 28; 39, 29 so that their end portions rest against a side of the wall of grooves 38 and 39 of the radial projection 32 of the second eye 31, whereas their middle portions containing the vertex of bending, are pressed against the opposite side of the wall of grooves 28 and 29 of the end portion 27 of the rod 22 so as to induced an elastic force which is strong enough to keep the two eyes 2 and 31 of the connecting rod together.

In the example shown, the basic portion 42 of the clamp 40 is fitted in a transversal groove 51 of a projection 50 extended from one of the lateral external faces of the radial projection 32. After mounting the clamp 40, the edges of the projection 50 adjacent the groove 51 may be slightly reshaped inwards so as to prevent the clamp 40 from sliding out from the groove.

The assembly procedure for the construction shown in FIGS. 3, 4, 5 and 6 will be described next, FIG. 2 being observed for a better understanding.

The crankshaft 7 is introduced into the bearing portion 6 through the upper side of the crankcase 4. The second eye 31 of the connecting rod is then inserted over the crank pin 11. With the valve plate 17 and cylinder head 18 removed, the assembly formed by the first eye 21 of the connecting rod, the piston 10 and the wrist pin 15 already assembled, is introduced into the cyliner 9 through the outer end 19. This assembly is then moved toward the other part of the connecting rod at the same time that it can be turned in the cylinder so as to permit proper connection of the parts 20 and 30 of the connecting rod.

After this, the elastic clamp is introduced with the help of a device in the transversal grooves of the pieces 20 and 30 of the connecting rod. After mounting, the clamp 40 is retained by means of a small deformation performed in the lateral projection 50 of the second eye 31.

The procedure for mounting the piston, connecting rod, and crank pin assembly, according to the example shown, ensures a high reliability and has advantages over the procedures described in the Brasilian patent application PI 8501128, such as absence of waste material as in the case of brazing or braze-welding. Another advantage over the previous procedure is that no time for curing is required, as in the case of adhesive use. Further more, the solution presented was conceived in order, to allow for easy automation of the procedure and increase productivity.

In spite of being described and illustrated as specific designs for clamp and grooves, it should be understood that there are a number of modifications that may be done without departing from the general principles of this invention.

Figure 7:
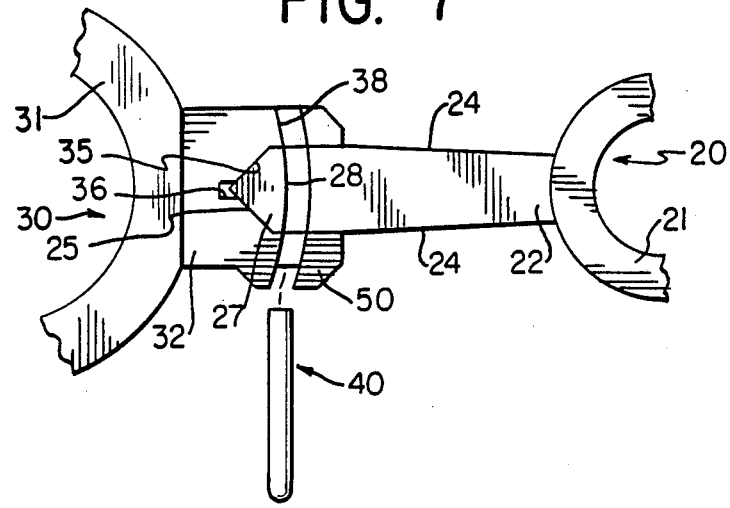
FIG. 7 shows an exploded top view of the connecting rod and the elastic clamp according to a first variation of the invention.

Referring to FIG. 7, the grooves 28, 38; 29, 39 may be made in such a way as to difine a curved superficial channel in the superior and inferior surfaces of the rod and radial projection 32 of the second eye 31. In this case the clamp 40 does not need to have curved arms.

Figure 8:
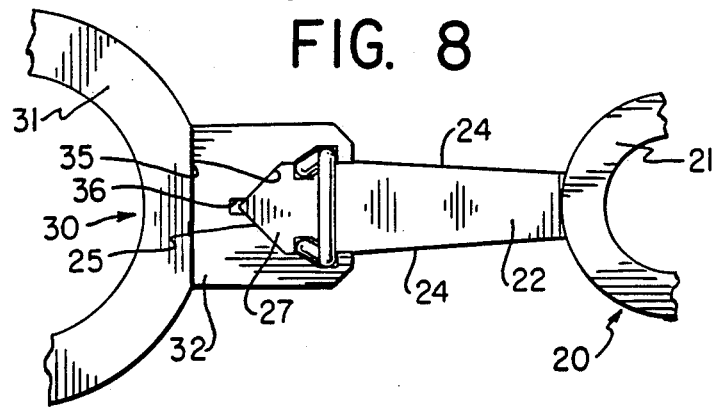
FIG. 8 shows a top view of the connecting rod and the elastic clamp according to a second variation of the invention.
Figure 9:
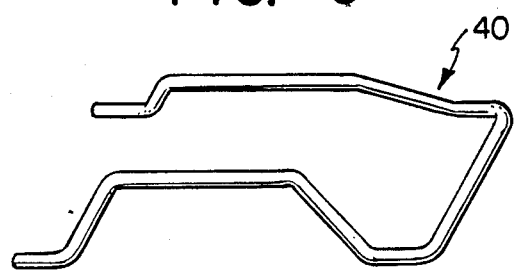
FIG. 9 shows a perspective view of the clamp used in the variation shown in FIG. 8.

Another possible solution is shown in FIG. 8 where the grooves are made in the adjacent lateral surfaces 34 and 24 of the groove 33 and the rod 22. For fastening the pieces a U-shaped clamp 40 (shown in FIG. 9) is used.

The grooves may also be transversally arranged, in different numbers through middle sections of the radial projection 32 and rod 22 assembly.

I claim:

1. Reciprocating Piston Compressor for a small Refrigerating Machine, of the type including a connecting rod with its first eye connected to the compressor piston by means of a wrist pin and connected with its second eye to the crank pin of a crankshaft, wherein the second eye of the connecting rod includes a radial projection with opposite lateral faces, superior and inferior faces, said radial projection being provided with a longitudinal slot having at least two end faces and two opposite lateral faces; a first eye provided with a lengthened radial rod having its end portion provided with at least two end faces, two opposite lateral faces, superior and inferior faces, said lengthened radial rod being fitted in the said longitudinal slot of the second eye, the axia distance between the centres of the eyes being defined by the contact between two faces of the end portion of the rod and two corresponding end faces of the longitudinal slot, characterized in that at least a fastening clamp (40) is fitted in respective housing defined by grooves (38, 39) made in the radial projection (32) of the second eye (31) and by grooves (28, 29) made in the end portion of the rod (22), said clamp (40) being designed in such a way as to press, due to its elastic action when it is fitted in the respective groove (38, 28, 39, 29) both parts (20, 30) of the connecting rod to a position of minimum axial distance between the centres of the eyes (21, 31) and fastening these parts (20, 30) in a relative and predetermined position of the eyes (21, 31).

2. Reciprocating Piston Compressor for a Small Refrigerating Machine, according to claim 1, characterized in that the housings are defined aligned passages (28, 38; 29, 39).

3. Reciprocating Piston Compressor for a Small Refrigerating Machine, according to claim 2, characterized in that the aligned passages (28, 38; 29, 39) are rectilinear and receive an elasctic clamp (41), the arm(s) of which are provided with a curved middle portion resting against a portion of the passage (28, 29) of the rod (22) and their end portions resting against a portion of the passage (38, 39) of the radial projection (32) in both sides of the longitudinal slot (33), with said middle portion pressing axially the rod (22) against the end walls (35) of the slot (33).

4. Reciprocating Piston Compressor for a Small Refrigerating Machine, according to claim 2, characterized in that the aligned passages (28, 38; 29, 39) are curved and receive an elastic clamp (41), the arms(s) of which are rectilinear having their end portions resting against portions of passage (38, 39) of the radial projection (32) in both sides of the longitudinal slot (33), the middle portion of the arm(s) resting against a portion of passage (28, 29) of the rod (22) so as to press axially the rod against the end walls (35) of the slot (33).

5. Reciprocating Piston Compressor for a Small Refrigerating Machine, according to claim 3, characterized in that the basic portion (42) of the clamp (41) is fitted in a groove (51) of a projection (50) extended from one of the lateral external faces of the pieces (20, 30) of the connecting rod.

6. Reciprocating Piston Compressor for a Small Refrigeration machine, according to claim 5, characterized in that clamp (40) presents a U-shape with two arms (41) extending from a basic portion (42), each arm of the clamp (41) being introduced in the aligned passages (28, 38; 29, 39).

7. Reciprocating Piston Compressor for a Small Refrigerating Machine, according to claim 6 and having the slot of the second eye and the end portion of the rod with the same thickness, characterized in that the set of passages (38, 28, 38; 39, 29, 39) is defined by a groove transversal to the axis of the rod (22) and made in each superior and inferior face of the radial projection (32) and the rod (22), the groove (51) for fitting the basic portion (42) being made in one lateral external face of the radial projection (32).

8. Reciprocating Piston Compressor for a Small Refrigerating Machine, according to claim 5, characterized in that the groove (51) for fitting the basic portion (42) of the clamp (40) has a projection (50) which is plastically reshaped, this projection (50) being made in one external face of one of the pieces (20, 30) of the connecting rod.

9. A Method of Assembling a Reciprocating Piston Compressor for a Small Refrigerating Machine, having a connecting rod as described in claim 1, siad method comprising the following steps: Mounting the piston to the part of the connecting rod defined by rod and the first eye;
Introducing the rod, first eye and piston assembly into the cylinder of the compressor through the outer end of the cylinder;
Mounting the second eye of the connecting rod on the crank pin of the crankshaft;
Sliding the piston in order to put the end faces of the rod and the slot in contact;
Maintaining this position during fastening of the two pieces of the connecting rod, said fastening being characterized in that a fastening clamp (40) is introduced in housings (38, 39; 28, 29) made in the radial projection (32) of the second eye (31) and in the end portion of the rod (22) so as to press, due to its elastic action, both parts (20, 30) of the connecting rod to a position of minimum axial distance between the centres of the eyes (21, 31) and fasten them in that position.

10. Reciprocating Piston Compressor for a Small Refrigerating Machine, according to claim 4, characterized in that the basic portion (42) of the clamp (41) is fitted in a groove (51) of a projection (50) extended from one of the laterl external faces of the pieces (20, 30) of the connecting rod.

* * * * *